(12) United States Patent
Akiyama et al.

(10) Patent No.: US 6,273,980 B1
(45) Date of Patent: Aug. 14, 2001

(54) VIBRATION WELDING APPARATUS AND VIBRATION WELDING METHOD

(75) Inventors: Kazuo Akiyama; Fujihiko Sugiyama; Masahiko Nishizaki, all of Shizuoka (JP)

(73) Assignee: Koito Manufacturing Co., Ltd., Tokyo (JP)

(*) Notice: Subject to any disclaimer, the term of this patent is extended or adjusted under 35 U.S.C. 154(b) by 0 days.

(21) Appl. No.: 09/511,906

(22) Filed: Feb. 23, 2000

(30) Foreign Application Priority Data

Feb. 23, 1999 (JP) .................................................. 11-044335

(51) Int. Cl.[7] .................................................. B29C 65/06
(52) U.S. Cl. .......................................... 156/73.5; 156/580
(58) Field of Search .................................. 156/73.5, 73.6, 156/292, 308.2, 580, 580.2; 264/68

(56) References Cited

U.S. PATENT DOCUMENTS

| 5,160,393 | * | 11/1992 | Snyder | 156/73.5 |
| 5,378,951 | * | 1/1995 | Snyder | 310/17 |
| 5,464,498 | * | 11/1995 | McGrath | 156/580.2 |
| 5,468,336 | * | 11/1995 | Lotz et al. | 156/580.2 |
| 6,033,505 | * | 3/2000 | Sugiyama et al. | 156/73.5 |
| 6,159,317 | * | 12/2000 | Sugiyama et al. | 156/73.5 |

\* cited by examiner

Primary Examiner—James Sells
(74) Attorney, Agent, or Firm—Sughrue, Mion, Zinn, Macpeak & Seas, PLLC

(57) ABSTRACT

A vibration welding apparatus and a vibration welding method in which the weight of a vibrating member is reduced and large synthetic resin members can be vibration welded. A vibration welding apparatus for joining two synthetic resin members, such as vehicular lamp lens members, through vibration welding is provided with a vibration generating mechanism, a vibrating member vibrated in a predetermined direction by the vibration generating mechanism, a base, a fixed-side jig disposed on the base for holding a first synthetic resin member, a holding jig composed of a holding jig part fixed to the vibrating member, and a holding part slidably mounted on the base so as to be slidable in the direction of vibration of the vibrating member such that the second synthetic resin member vibrates synchronously with the vibrating member.

5 Claims, 2 Drawing Sheets

VIBRATION WELDING APPARATUS AND VIBRATION WELDING METHOD

FIELD OF THE INVENTION

The present invention relates to a vibration welding apparatus and a vibration welding method. More specifically, the present invention relates to a vibration welding apparatus and vibration welding method capable of vibration welding large synthetic resin members and in which the weight of the vibrating member is reduced.

BACKGROUND OF THE INVENTION

An apparatus and method for joining two synthetic resin members through vibration welding have been well known. FIG. 2 shows an example a of a conventional vibration welding apparatus.

A fixed jig part d and a movable jig part e, which constitute a fixed-side jig c, are disposed on a base b. The movable jig part e is slidably supported on a slide rail f so as to be movable towards or away from the fixed jig part d. The movable jig part e is moved toward or away from the fixed jig part d by a cylinder g mounted on the base b.

A vibrating member h, which is supported so as to be vibrated by a vibration generating mechanism i, supports a fixed jig part k and a movable jig part l, which together constitute a jig j on the side of the vibrating mechanism. The movable jig part l is slidably supported on a slide rail m so as to be movable towards or away from the fixed jig part k. The movable jig part l is moved toward or away from the fixed jig part k by a cylinder n mounted on the vibrating member h.

For example, to join two lens members o, p by vibration welding, the lens member o is first temporarily fixed to the movable jig part e, and then the cylinder g is then driven to move the movable jig part e towards the fixed jig part d such that the lens member o is fixed between the movable jig part e and the fixed jig part d. Then, the lens member p is temporarily fixed to the movable jig part l, and the cylinder n is driven to move the movable jig part l toward the fixed jig part k such that the lens member p is fixed between the movable jig part l and the fixed jig part k.

A cylinder (not shown) is driven to move the base b upward such that welding portions o', p' of the respective lens members o, p are brought into pressure contact with each other. The vibration generating mechanism i is then activated to vibrationally drive the vibrating member h so as to weld together the welding portions o' and p' of the lens members o, p.

In the conventional vibration welding apparatus a as described above, the vibrating member h carries all elements required for holding one of the synthetic resin members, that is, in the aforementioned example, the lens member p, including the fixed jig part k, movable jig part l, slide rail m for supporting the movable jig l, cylinder n for moving the movable jig l, and the like. As a result, the weight of the overall vibrating member is high, requiring a large vibration generating mechanism. Welding of a large synthetic resin member requires a large jig, thus further increasing the weight of the vibrating member. In this case, it becomes difficult to vibrationally drive the vibrating member.

In conjunction with the foregoing problem, it is an object of the present invention to reduce the weight of the vibrating member and to make vibration welding of large synthetic resin members possible.

SUMMARY OF THE INVENTION

In order to solve the foregoing problem, there is provided a vibration welding apparatus for joining two synthetic resin members through vibration welding which includes a vibration generating mechanism, a vibrating member vibrated in a predetermined direction by the vibration generating mechanism, a base, a fixed-side jig disposed on the base for holding a first synthetic resin member, a holding jig part mounted on the base in such a manner as to be slidable in the direction of vibration for holding part of a second synthetic resin member, and a holding jig part mounted on the vibrating member for holding the second synthetic resin member in cooperation with the holding jig part on the base side such that the second synthetic resin member vibrates synchronously with the vibrating member.

In the vibration welding apparatus of the present invention, because one of the two jig parts that together form the vibrating-side jig which holds the second synthetic resin member is disposed on the base, the total weight of the vibrating member is reduced, making it possible to effect the vibration of the vibrating member without requiring the use of a substantially large vibration generating mechanism while enabling large synthetic resin members to be vibration welded.

Further to solve the aforementioned problem, there is further provided a vibration welding method including the steps of holding a first synthetic resin member with a fixed-side jig mounted on a base, holding a second synthetic resin member with a holding jig composed of a holding jig part mounted on a vibrating member and a holding jig part slidably mounted on the base in such a manner as to be slidable in the same direction as the direction of vibration of the vibrating member, bringing the portions to be welded of the first and second synthetic resin members into pressure contact with each other, and welding the welding portions of the first and second synthetic resin members by vibrating the vibrating member.

DESCRIPTION OF THE PREFERRED EMBODIMENTS

Figure 1:
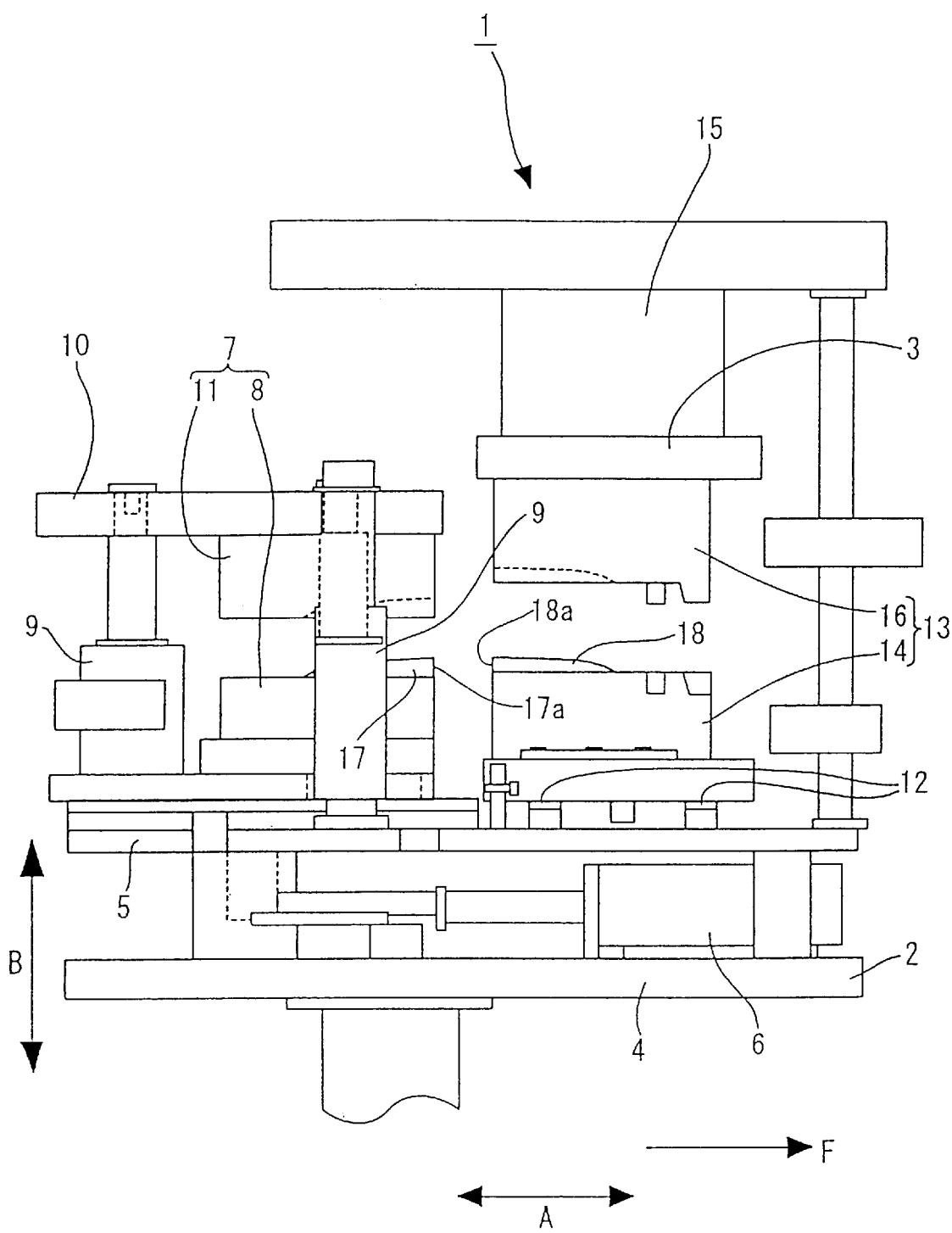
FIG. 1 is a schematic side view showing a vibration welding apparatus of the present invention.
Figure 2:
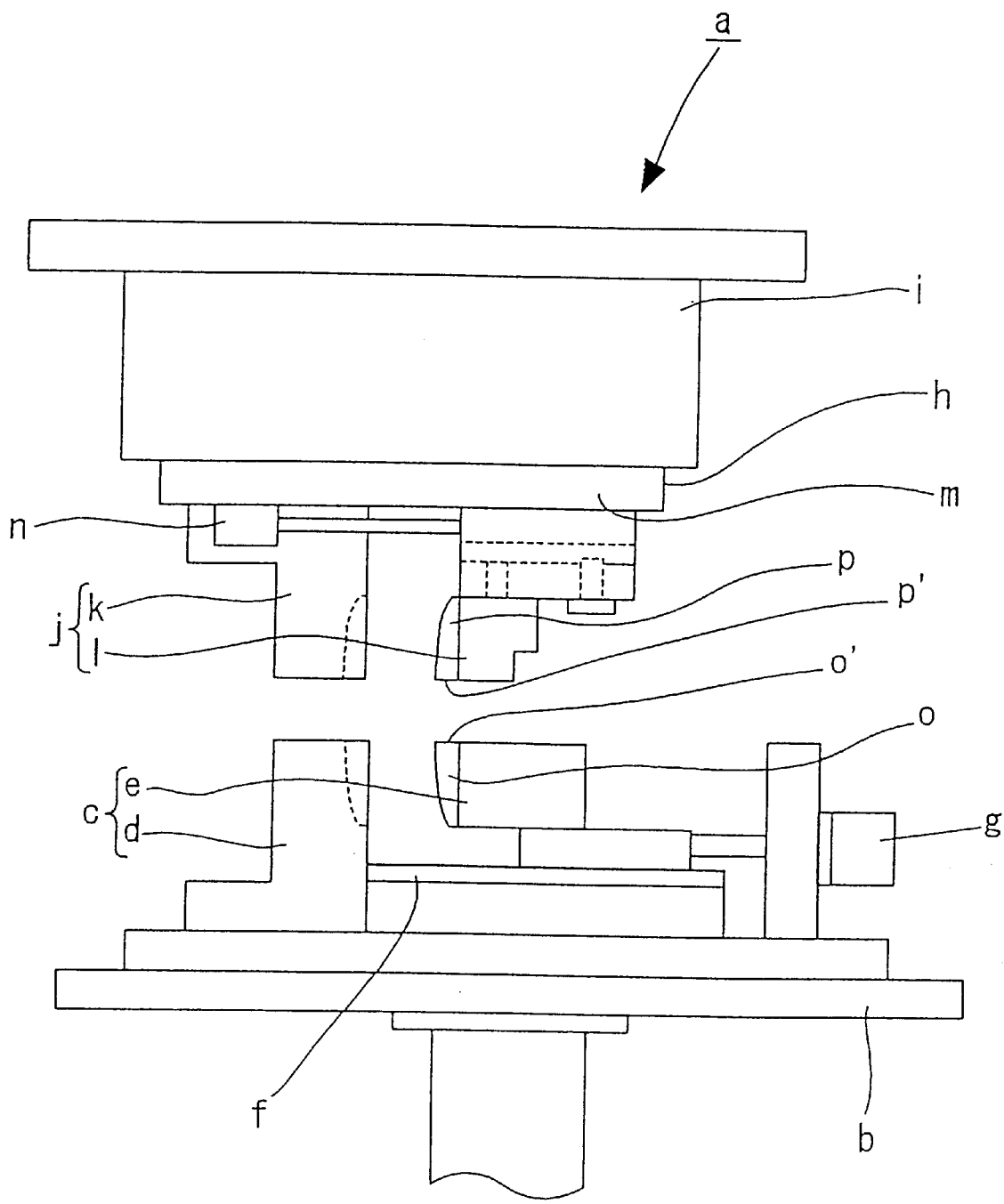
FIG. 2 is a schematic side view showing an example of a conventional vibration welding apparatus.

A preferred embodiment of a vibration welding apparatus and a vibration welding method according to the present invention will be hereinafter described with reference to the drawings. In these embodiments, the present invention is exemplified by a vibration welding apparatus for producing a vehicular lamp lens by joining two lens members through vibration welding.

A vibration welding apparatus 1 is provided with a base 2 and a vibrating member 3. The base 2 includes a first vertically movable base member 4 that can be moved vertically by a cylinder (not shown), and a slide base member 5 supported on the fixed base member 4 so as to be movable in the longitudinal direction, that is, in the direction indicated by an arrow A shown in FIG. 1. The slide base member 5 is moved in the longitudinal direction by a cylinder 6 mounted on the fixed base member 4.

A fixed jig part 8, which is one of two jig parts that constitute a fixed-side jig 7, is mounted on the slide base member 5. A second vertically movable base member 10 driven by a plurality of cylinders 9 (only two cylinders are shown in the drawing) is supported on the slide base member 5 for vertical motion, that is, in the direction indicated by an arrow B shown in FIG. 1. A movable jig part 11, which is the other of the two jig parts that constitute the fixed-side jig 7, is mounted on the lower surface of the vertically movable base member 10.

A holding jig part 14, which is one of the jig parts that constitute a vibrating-side jig 13, is mounted on the front side of the base member 5 via a laterally extending slide rail 12 so as to be laterally slidable, that is, slidable in the direction perpendicular to the surface of the drawing.

The vibrating member 3 is vibrated in the lateral direction by a vibration generating mechanism 15 at a predetermined frequency and amplitude. A holding jig part 16 on the vibrating side, which is the other of the two jig parts that constitute the vibrating-side jig 13, is supported at a position opposing the holding jig part 14 on the base side on the lower surface of the vibrating member 3.

Described below is a process for vibration welding two lens members 17, 18 utilizing the above-described vibration welding apparatus 1.

First, the lens member 17 is temporarily fixed to the fixed-side jig part 8 through, for example, suction. The cylinders 9 are driven to move the movable jig part 11 downward such that the lens member 17 is fixed and held between the movable jig part 11 and the fixed jig part 8.

Then, the lens member 18 is temporarily fixed to the holding jig part 14 on the base side also through vacuum suction, for example. A cylinder (not shown) is driven to move the entire base 2 upward such that the lens portion 18 is fixed and held between the holding jig part 14 on the base side and the holding jig part 16 on the vibrating member side.

The cylinder 6 is then driven to move the slide base 5 forward, that is, in the direction indicated by an arrow F shown in FIG. 1. Consequently, the entire fixed-side jig 7 supported on the slide base 5 is moved forward, and subsequently the welding portion 17a of the lens member 17 is held by the fixed-side jig 7 is brought into pressure contact with the welding portion 18a of the lens member 18 held by the vibrating-side jig 13.

When the two welding portions 17a, 18a are brought into pressure contact with each other, the vibration generating mechanism 15 is driven to vibrate the vibrating member 3 in the lateral direction, that is, in the direction perpendicular to drawing, at a predetermined frequency and amplitude. Because the holding jig part 14 on the base side, namely, one of jig parts constituting the vibrating-side jig 13, is supported on the fixed side by means of the slide rail 12 in such a manner as to be movable in the lateral direction, the holding jig part 14 is vibrated together with the holding jig part 16 fixed to the vibrating member 3 synchronously with the vibration of the vibrating member 3. Accordingly, the welding portions 17a, 18a of the lens members 17, 18 are fused and bonded, that is, welded together.

The base 2 is moved downward to release the lens member 18 from the vibrating-side jig 13. The slide base 5 is retracted and the movable jig 11 is raised so as to release the lens member 17 from the fixed-side jig 7. The resultant vehicular lamp lens formed by welding the lens members 17, 18 is then extracted.

According to the above-described vibration welding apparatus and vibration welding method, the holding jig member 14 on the base side, that is, one of two jig parts that constitutes the vibrating-side jig 13 for holding the lens member 18, is mounted on the base 2. As a result, the weight of the vibrating member 3 is reduced, making it possible to vibrationally drive the vibrating member easily without requiring the use of a large vibration generating mechanism, and thereby enabling a large lens to be vibration welded.

The aforementioned embodiment has been described with reference to the production of a lens for a vehicular lamp by joining two lens members through vibration welding. However, the present invention is not limited to the welding of lenses for vehicular lamps, but is widely applicable for the welding of other kinds of synthetic resin articles.

The configuration and structure of the various elements shown in the aforementioned embodiment are only examples of implementing the present invention, and it is to be distinctly understood that the present invention is not limited thereto but may be otherwise variously embodied within the scope of the claims.

As is apparent from the foregoing description, the vibration welding apparatus of the present invention includes a vibration generating mechanism, a vibrating member vibrated in one direction by the vibration generating mechanism, a base, a fixed-side jig disposed on the base for holding a first synthetic resin member, a holding jig part slidably mounted on the base so as to be slidable in the direction of vibration of the vibrating member for holding a second synthetic resin member, and a holding jig part mounted on the vibrating member for holding the second synthetic resin member in cooperation with the holding jig part slidably mounted on the base such that the second synthetic resin member vibrates synchronously with the vibrating member.

In the vibration welding apparatus according to the present invention, because one of the two parts constituting the vibrating-side jig which holds the second synthetic resin member is supported on the base, the total weight of the vibrating member can be reduced, which makes it possible to vibrationally drive the vibrating member without requiring the use of a large vibration generating mechanism, as well as enabling large synthetic resin members to be vibration welded.

The inventive vibration welding method for joining two synthetic resin members through vibration welding includes the steps of holding a first synthetic resin member with a fixed-side jig mounted on the base, holding the second synthetic resin member with a vibrating-side jig composed of a holding jig part mounted on the base so as to slide in the same direction as the direction of vibration of the vibrating member and a holding jig part fixed to the vibrating member, bringing the portions to be welded of the first and second synthetic resin members into pressure contact with each other, vibrating the holding jig part fixed to the vibrating member and thus causing the holding jig part slidably mounted on the base to vibrate synchronously therewith, thereby welding the first and second synthetic resin members by vibrating the vibrating member.

In the vibration welding method of the present invention, a part of the second synthetic resin member is held by the holding jig part on the base side disposed on the base so as to be slidable in the same direction as the direction of vibration of the vibrating member.

While the invention has been described in detail and with reference to specific embodiments thereof, it will be apparent to one skilled in the art that various changes and modifications can be made therein without departing from the spirit and scope thereof.

What is claimed is:

1. A vibration welding method for joining two synthetic resin members through vibration welding, comprising the steps of:

holding a first synthetic resin member with a fixed-side jig mounted on a base;

holding a second synthetic resin member with a holding jig comprising a holding jig part fixed to a vibrating member and a holding jig part slidably mounted on said base so as to be slidable in the same direction as a direction of vibration of said vibrating member;

bringing portions to be welded of said first and second synthetic resin members into pressure contact with each other; and welding portions to be welded of the first and second synthetic resin members by vibrating said vibrating member.

2. A vibration welding apparatus for joining first and second synthetic resin members through vibration welding, comprising:

a vibration generating mechanism;

a vibrating member vibrated in a predetermined direction of vibration by said vibration generating mechanism;

a base;

a fixed-side jig mounted on said base for holding said first synthetic resin member;

a holding jig part mounted on said base so as to be slidable in said direction of vibration; and a holding jig part fixed to said vibrating member for holding said second synthetic resin member in cooperation with said holding jig part mounted on said base such that said second synthetic resin member vibrates synchronously with said vibrating member.

3. The vibration welding apparatus of claim 2, wherein said base comprises a fixed base member, a slide base member slidably mounted on said fixed base member, said fixed-side jib being mounted on said slide base member, and a cylinder for moving said slide base member in a direction parallel to a surface of said fixed base member.

4. The vibration welding apparatus of claim 3, further comprising a vertically movable base for opening and closing said fixed-side jig.

5. The vibration welding apparatus of claim 3, further comprising a pair of rails for slidably mounting said holding jig part mounted on said base.

* * * * *